United States Patent Office

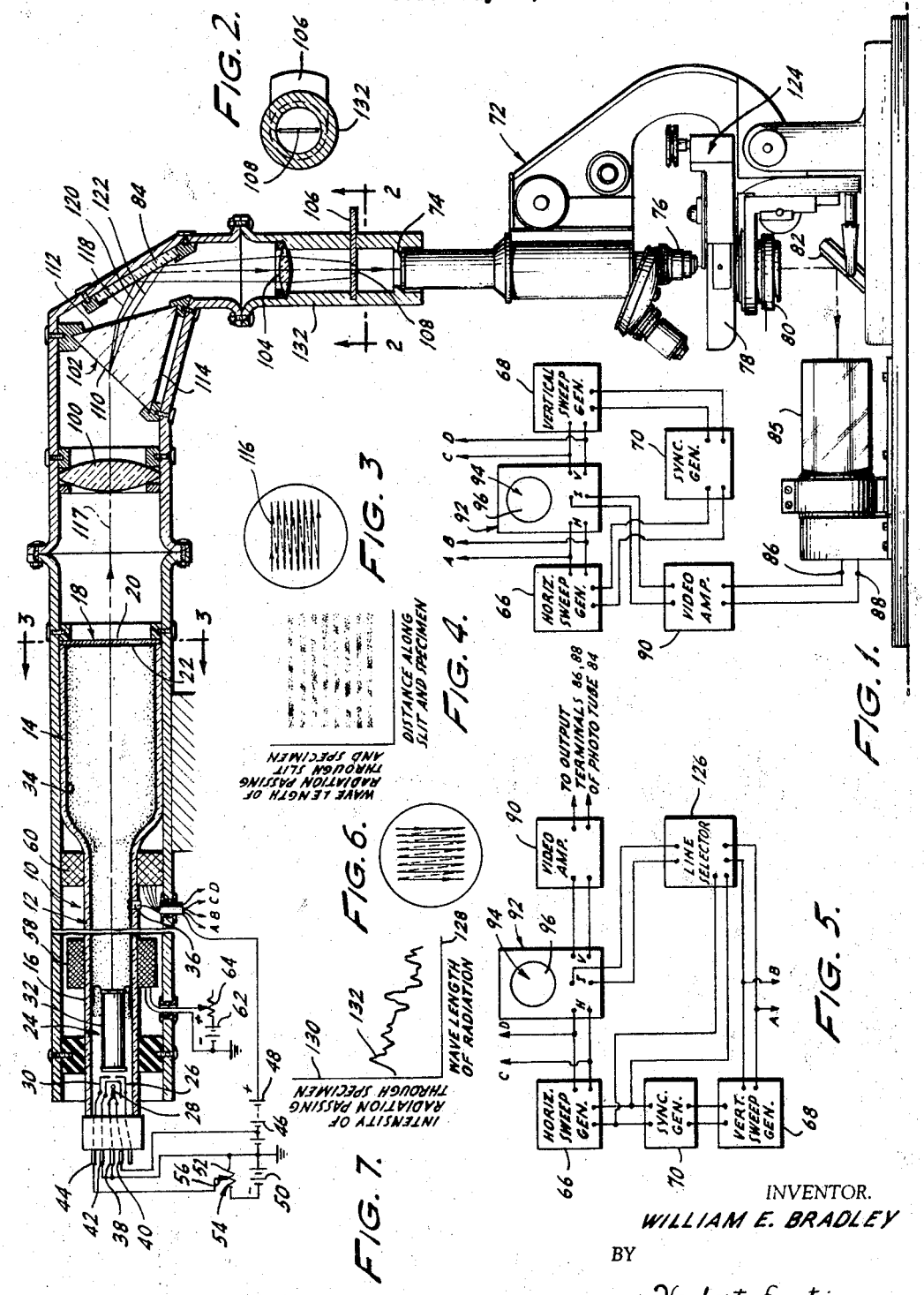

3,205,763
Patented Sept. 14, 1965

3,205,763
LIGHT SOURCE ESPECIALLY USEFUL IN
SPECTROSCOPIC SYSTEMS
William E. Bradley, Washington, D.C., assignor, by mesne
assignments, to Philco Corporation, Philadelphia, Pa.,
a corporation of Delaware
Filed May 13, 1960, Ser. No. 28,884
7 Claims. (Cl. 88—14)

This invention relates to a novel light source which is especially well suited for use with spectroscopic systems. In addition it relates to a novel microspectroscopic system, employing this novel light source, which is especially well suited for determining the absorption spectrum of a microscopic specimen either at a large number of discrete, closely-spaced wavelengths or over a continuous wide band of wavelengths.

The techniques of absorption spectroscopy and spectrophotometry are important in studying the chemical structure and reactions of complex organic molecules, in particular those of biological origin, because the absorption spectra of many such molecules are highly distinctive and hence such molecules can be identified by their absorption spectra even when admixed with many other substances. Moreover the specific form of the absorption spectrum of a molecule provides information about its chemical structure, e.g. the types of bonding between its constituent atoms, which is not otherwise readily ascertainable. However heretofore only apparatus whose light source comprises either rapidly-rotating color-filter disks or delicate, slow-operating mechanically-actuated monochrometers was available for obtaining the absorption spectrum of microscopically-small specimens either over a continuous band of wavelengths or at a few discrete wavelengths. Accordingly there has been a distinct need for relatively rugged microspectroscopic apparatus whose light source has no moving parts and which is capable of displaying practically instantaneously either a continuous spectrum or a spectrum consisting of a large number of discrete, closely-spaced wavelengtth components. This rapidity of operation is particularly important where the specimen is a living cell and the illuminating radiation is ultraviolet light, since ultraviolet light tends to kill living cells.

Accordingly it is an object of the invention to provide a novel light source.

Another object is to provide a novel light source especially well suited for use in spectroscopic systems.

Another object is to provide improved spectroscopic apparatus.

Another object is to provide a novel light source requiring no moving parts.

Another object is to provide improved microspectroscopic apparatus employing the novel light source.

Another object is to provide an improved microspectroscopic apparatus which can display instantaneously the continuous absorption spectrum of a microscopic specimen over a wide band of wavelengths.

Another object is to provide a microspectroscopic system which can display instantaneously the absorption spectrum of a microscopic specimen at a large number of closely-spaced, discrete wavelengths.

Another object is to provide a microspectroscopic system which displays almost instantaneously the absorption spectrum of a microscopic specimen.

Another object is to provide a microspectroscopic system operative in the ultraviolet region.

Another object is to provide a microspectroscopic system which can be operated by relatively unskilled personnel.

In accordance with the invention the foregoing objects are achieved by a spectroscopic system comprising in combination a novel light source, a region impinged by light from this source and adapted to be occupied by a specimen, and means for sensing the intensity of light emanating from that region. More particularly the novel light source comprises means for causing successive small areas of a surface sequentially to emit polychromatic light, means for angularly dispersing polychromatic light emitted by these areas, and means impinged by this angularly dispersed light for selectively transmitting a substantially monochromatic component thereof whose wavelength is dependent on the position of the contemporaneously emissive one of said areas. The means for causing light emission typically comprise a cathode-ray tube having a screen emissive of polychromatic light on impingement by a cathode-ray beam (i.e. a flying-spot scanner tube), and means for scanning the beam of the tube over its screen along a plurality of successive substantially parallel paths, thereby to cause successive small areas of the screen sequentially to emit polychromatic light. The light-dispersing means typically comprise a triangular prism or a grating, and the selectively-transmissive means typically comprise a mask impinged by the angularly dispersed light, having a slit which transmits the component of the dispersed light incident on the slit. As discussed more fully hereinafter the novel light source, in one form, is adapted to project onto the specimen, along a stationary line thereon, a succession of small, laterally displaced spots of substantially monochromatic light whose wavelength is determined by the position of the contemporaneously-scanned path on the screen of the cathode-ray tube. In particular the wavelength of the monochromatic light produced by this form of the source is substantially constant for any single line scanned on the screen of the scanner tube, and is different for each differently-positioned line scanned thereon. The monochromatic light produced by the source may be projected by way of the ocular and objective of a microscope. Because the specimen is sequentially illuminated along successive small areas thereof by the monochromatic light, the sensing means arranged to receive light passing through the specimen senses at each instant the intensity of monochromatic light passing through a single small area of the specimen. The position of the latter small area corresponds to the position on the scanner-tube screen of the small area thereof instantaneously emitting light. Accordingly where as in the preferred embodiment the sensing means comprise means for producing an electrical signal whose value is dependent on the intensity of light incident thereon, this signal may be employed to modulate the beam of a picture tube, which beam is also scanned over the screen of the picture tube in coordination with the scansion of the beam of the scanner tube. When this is done a display is produced on the screen of the picture tube made up of a plurality of substantially-parallel laterally-displaced lines, each typically varying in intensity along the length thereof. Each line of the display represents the intensity of substantially monochromatic light of a given wavelength passing through each illuminated point of the microscopic specimen and the entire display represents the absorption spectrum over a plurality of relatively closely-spaced wavelengths of the points lying along the single illuminated line of the specimen.

In another embodiment according to the invention, the light source is constructed and arranged so as to illuminate a single point of the specimen during the tracing of each linear path on the scannner tube screen, with light which is always monochromatic but whose wavelength changes continuously in correspondence with the continuous change in position of the light-emissive area along the contemporaneously traced path. Moreover the scansion of each different path on the screen illuminates a different point on the specimen. Accordingly in this system the light-sensing means produce a signal during each line scansion whose instantaneous value represents the intensity of monochromatic light transmitted by a single small area of the specimen, the wavelength of the monochromatic light changing continuously during the scansion of the line. Accordingly by vertically deflecting the beam of a picture tube through a distance dependent on the intensity of the signal produced by the sensing means, by horizontally deflecting the beam of the picture tube in coordination with the scansion of the scanner-tube screen, and by causing the beam of the picture tube to have an intensity sufficient to produce light on the screen of the picture tube only during the time a selected line of the scanning pattern is traced on the scanner-tube screen, a graphical display of the continuous absorption spectrum of a single small area of the specimen is produced by the picture tube. The ordinate of this display represents the intensity of illumination passing through the illuminated small area of the specimen and its abscissa represents the wavelength of illumination incident on this area. In each embodiment the spectrum is displayed substantially instantaneously on the screen of the picture tube without resort to mechanical systems having moving elements.

The invention will be understood more fully from a consideration of the following description taken in connection with the accompanying drawings in which:

FIGURE 1 illustrates diagrammatically one embodiment of the source and spectroscopic system of the invention;

FIGURE 2 illustrates a portion of the embodiment of FIGURE 1;

FIGURE 3 illustrates a scanning pattern;

FIGURE 4 illustrates diagrammatically a display formed by the embodiment of FIGURE 1;

FIGURE 5 illustrates another embodiment of the invention;

FIGURE 6 illustrates another scanning pattern, and

FIGURE 7 illustrates a display formed by the embodiment of FIGURE 5.

FIGURE 1 illustrates a microspectroscopic system according to the invention adapted instantaneously to produce a visual display of the intensity of monochromatic light transmitted by an elongated portion of a specimen at each of a plurality of discrete, closely-spaced wavelengths of ultraviolet light. To produce polychromatic ultraviolet light, the apparatus includes a flying-spot scanner tube 10 which comprises an evacuated glass envelope 12 having a cylindrical member 14, a coaxial neck 16 joined to one end thereof and a screen member 18 joined to the other end thereof. Screen member 18 comprises a window 20 transmissive of ultraviolet light, e.g. one composed of fused quartz, whose interior surface 22 is coated with a cathodoluminescent phosphor emissive of a relatively wide continuous band of ultraviolet light. Preferably this phosphor has short rise and decay times thereby to provide at each instant a sharply-defined spot of light even during rapid scansion. In the present embodiment the phosphor is composed of beryllium orthosilicate, a substance which emits a substantially continuous spectrum of ultraviolet light in a waveband extending from less than 200 millimicrons to more than 400 millimicrons. The phosphor emits most efficiently at about 240 millimicrons and has an emission efficiency of at least 50 percent that at 240 millimicrons between about 216 and 282 millimicrons. Its rise and decay times are only about 0.4 and 0.8 microsecond respectively. To increase the amount of light delivered by the screen to the succeeding optical elements of the system, the phosphor coating is aluminized after its deposition on quartz window 20.

Tube 10 also comprises an electron gun 24 positioned coaxially within neck 16, comprising a cathode 26, a heater 28 therefor, a control electrode 30 and an anode 32. A conductive coating 34, e.g. of aquadag, is applied to the entire interior surface of cylindrical member 14 and to a portion of the interior surface of neck 16 in conventional manner. Anode 32 is electrically connected to this coating by means of metal spring fingers which press thereagainst. A metal connector 36 sealed into neck 16 and having spring fingers pressing against coating 34 provides an external electrical connection thereto and to anode 32. Tube prongs 38 and 40 provide external electrical connections to heater 28, prong 42 provides an electrical connection to cathode 26 and prong 44 provides an electrical connection to control electrode 30. A battery 46 energizes heater 28. Cathode 26 is connected to a point at reference potential, and a battery 48 supplies a potential positive with respect to that of cathode 26 to anode 32 and coating 34. Typically this voltage is about 25 kilovolts. The intensity of the beam current of tube 10 is controlled by applying to control electrode 30 a potential negative with respect to that of cathode 26. This potential is supplied by a battery 50 shunted by the resistance element 52 of a potentiometer 54. The positive terminal of battery 50 is connected to cathode 26 and the movable arm 56 of potentiometer 54 is connected to prong 44. Typically the beam current is about 50 microamperes.

A coil 58 is provided for focusing on screen 18 the electron beam generated by gun 24 and a deflection yoke 60 having horizontal and vertical deflection windings is provided for scanning this beam thereover. Both of these coils are mounted coaxially with tube neck 16. Focusing coil 58 is energized by a battery 62 connected thereto by way of a rheostat 64, and deflection coil 60 is supplied with appropriate horizontal and vertical sweep signals by horizontal and vertical sweep generators 66 and 68 respectively, whose operation is synchronized by signals supplied thereto by a synchronizing generator 70. In particular, the output terminals of horizontal sweep generator 66 are connected to the horizontal deflection windings of coil 60 via input terminals A, B, and the output terminals of vertical sweep generator 68 are connected to the vertical deflection windings of coil 60 via input terminals C, D. Sweep generators 66 and 68 and synchronizing generator 70 may be of conventional construction.

The system additionally comprises a microscope 72 having an ocular 74, an objective 76, a specimen stage 78 adapted to receive and adjust the position of a slide supporting a specimen, a substage optical system 80 and a mirror 82 which preferably is silvered or aluminized on its front surface for most efficient reflection. A mirror 84, also preferably aluminized or silvered on its front surface, is arranged to transmit light generated by the screen 18 of scanner tube 10 to the ocular 74 of microscope 72. In the specific embodiment shown herein, wherein the microscope is to be used in conjunction with ultraviolet light, the optical system thereof is constructed of elements which are preferably achromatic over a relatively wide band of wavelengths in the ultraviolet region. While transmissive optics constructed of quartz, fluorite or lithium fluoride have been achromatized for narrow bandwidths of ultraviolet light, Polaroid-Grey reflective optics are preferred because they are achromatic over substantially wider bandwidths of the ultraviolet region. One form of these optics is illustrated and described in the paper, "Microscope Optics," by L. V. Foster, Analytical Chemistry, vol. 21, No. 4 (April 1949), at page 433 (FIG. 3) and page 434. Moreover the microscope slide and cover glass employed to mount the specimen should be composed of a substance transmissive of ultraviolet light, e.g. fused quartz.

The system additionally comprises means for sensing the intensity of light passing through the microscope and specimen. In the present embodiment these means comprise a photomultiplier tube 85 whose photoresponsive element is sensitive to light of the wavelengths emitted by screen 18 of flying-spot scanner tube 10, and which is positioned so that this element receives light passing through microscope 72 and the specimen and reflected by mirror 82. The output signal produced by photomultiplier tube 85 appears across terminals 86 and 88 and is amplified by a video amplifier 90 of appropriate bandwidth. The amplified video signal is supplied to the intensity-modulation terminals I of an oscilloscope 92 having a cathode ray tube 94. The cathode-ray beam of tube 94 is scanned across its screen 96 in coordination with the scansion of screen 18 of scanner tube 10 by supplying to the horizontal and vertical input terminals H and V respectively of oscilloscope 92 the horizontal and vertical sweep signals generated respectively by sweep generators 66 and 68.

The system as thus far described is similar to prior-art flying-spot scanner microscopes described for example in the paper "Flying-Spot Microscope," by F. Roberts, J. Z. Young and D. Causley, Electronics, July 1953, pages 137 to 139. In such systems the beam of the flying-spot scanner tube scans a pattern such as that shown in FIGURE 3. At each instant the spot of light emitted by the screen of the scanner tube is transmitted to the microscope which forms a demagnified image of the spot on the specimen beneath the objective. The phototube receiving that portion of the light from the flying spots passing through the specimen produces a signal in response thereto. Because the flying spot changes position during scansion, this signal is representative of the intensity of light transmitted by successive small areas of the specimen. By controlling the intensity of the cathode-ray beam of the picture tube in accordance with this signal and by scanning the beam of the picture tube in coordination with the scansion of the beam of the scanner tube, an enlarged, visible image of the microscopic specimen is reproduced on the screen of the picture tube. However the latter display provides no information concerning the absorption spectrum characteristics of any portion of the specimen, and hence such a system is useful only in qualitative microscopy.

In accordance with the invention, to provide detailed, quantitative information regarding the absorption spectrum of a selected portion of the specimen, the system shown in FIGURE 1 also comprises means positioned in the optical path between screen 18 and stage 78 for angularly dispersing light emitted from the successive small areas of screen 18 coincident with the scanning path, and means impinged by this angularly dispersed light for selectively transmitting to a given portion of the specimen substantially monochromatic light whose wavelength varies with the position on screen 18 of the contemporaneously emissive area thereof. In the arrangement of FIGURE 1, these means include a lens 100 for collimating light emitted by screen 18, a prism 102 for dispersing light from screen 18, mirror 84 for directing the dispersed light toward ocular 74 of microscope 72, a second lens 104 for focusing the dispersed light upon the photographic image plane of microscope 72 and an opaque mask 106 preferably positioned in the photographic image plane of the microscope and having a slit 108 for selectively transmitting to ocular 74 the component of the dispersed light incident on slit 108. Prism 102 is oriented so that its axis, and hence the edges of its faces 110, 112 and 114 perpendicular to its base, are substantially horizontal and parallel to screen 18. Accordingly when a pattern 116 (see FIGURE 3) comprising a plurality of successively scanned substantially parallel, vertically displaced horizontal line-segments is traced on screen 18, polychromatic light from the successively luminous areas along this pattern is directed by lens 100 onto face 110 of prism 102. This light impinges face 110 along successive lines substantially parallel to the longitudinal axis of prism 102, and each beam thereof, e.g. 117, is angularly dispersed by prism 102 into a plurality of beams of substantially monochromatic light, e.g. 118, 120, 122 lying in a plane transverse to the longitudinal axis of prism 102. This dispersed light is reflected by mirror 84 and focused by lens 104 onto opaque mask 106. In accordance with the invention, slit 108 of mask 106 is oriented transverse, e.g. perpendicular to the plane of dispersion of the light impinging mask 106.

Under these conditions the dispersed light impinging mask 106 traces a line-segment of monochromatic light along slit 108. This line segment of monochromatic light is transmitted therethrough, demagnified by the ocular 74 and objective 76 of microscope 72 and focussed on the specimen positioned on stage 78. Because each line of the scanning pattern 116 on screen 18 is vertically displaced from other lines thereof, the scanning of successive vertically-displaced line-segments causes monochromatic light of successively different wavelengths to coincide with slit 108 and illuminate the specimen. Accordingly as each line of the scanning pattern is traced out on screen 18, a fixed line on the specimen positioned on stage 78 is traversed by a demagnified, monochromatic component of the flying spot on screen 18. The wavelength of this component is uniquely determined by the vertical position of the line contemporaneously scanned on screen 18. Photomultiplier tube 85 develops at its output terminals 86, 88 a video signal whose intensity varies in accordance with the intensity of the monochromatic light transmitted through the instantaneously illuminated point on the specimen. By applying this video signal to the intensity modulation terminals I of oscilloscope 92 via video amplifier 90 and by concurrently scanning the beam of picture tube 94 in coordination with the scansion of the beam of scanner tube 10, a succession of vertically-displaced images of the illuminated line of the microscope specimen are produced on screen 96.

FIGURE 4 is a diagrammatic representation of eight such line images. The intensity of light produced at each point of each line image is indicative of the intensity of monochromatic light transmitted through the corresponding point on the specimen. The vertical position of each line image is indicative of the wavelength of monochromatic light passing through the specimen. If desired the screen 96 of picture tube 94 may have appropriate indicia placed thereon designating the wavelength of light corresponding to each vertical position thereon. Accordingly by observing the variations in intensity along ordinates of the image, it is feasible to determine the wavelengths at which each portion of the illuminated line of the specimen absorbs the light incident thereon. Moreover by photographing the display on screen 96 of picture tube 94 and measuring the density at each point of the photographic image with a photographic densitometer, the quantitative absorption spectrum of each point along the scanned line on the specimen can be ascertained accurately.

For clarity of illustration only eight horizontal scan lines, and the images produced thereby, have been shown in FIGURES 3 and 4 respectively. However in practice between 500 and 1,000 horizontal scan lines would typically be employed. Under these conditions the absorption spectrum at between 500 and 1,000 discrete, closely-spaced wavelengths would be obtained. It is thus seen that the instrument is capable of high-resolution spectroscopy. Moreover while in the embodiment shown slit 108 in mask 106 is aligned along a diameter of the optical field of microscope 72, observation obviously is not confined to only one portion of the specimen. By appropriate manipulation of the mechanical stage 124 mounted on stage 78, the microscope slide may be moved so as to center any portion of the specimen beneath objective 76. Hence any portion of the microscopic specimen may be spectroscopically analyzed.

Often in analyzing the composition of heterogeneous biological material, e.g. a portion of a chromosome of a cell, a display is desired which depicts variations in transmission of monochromatic light by a single point in the specimen over a continuous wide band of wavelengths.

By minor modifications the arrangement of FIGURE 1 can be adapted to produce such a display. The modifications required are illustrated in FIGURE 5. As shown therein, the output of horizontal sweep generator 66 is now supplied to the vertical deflection windings of deflection coil 60 via terminals C, D, and the output of vertical sweep generator 68 is now supplied to the horizontal deflection windings of coil 60 via terminals A, B. The output of horizontal sweep generator 66 also is supplied as before to the horizontal input terminals H of oscilloscope 92. However the output of vertical sweep generator 68 no longer is supplied to vertical deflection terminals V of oscilloscope 92. Instead the output of video amplifier 90 is supplied to vertical input terminals V. In addition the system now comprises a line selector 126 whose input terminals are supplied with the vertical sweep signal and the horizontal synchronizing pulses and whose output signal is supplied to intensity modulation terminals I of oscilloscope 94. Horizontal line selector 126 is constructed and arranged to produce a pulsatile signal which cuts off the beam of tube 94 except when a selected line is being scanned on screen 18 of scanner tube 10, and which gates on the beam of tube 94 when the selected line is being scanned. To produce such a signal, line selector 126 typically comprises a counter circuit arranged to count the leading edges of successive horizontal synchronizing pulses produced by synchronizing generator 70 after the production of each fly-back pulse by vertical sweep generator 68, and to generate an appropriately-poled pulse having a duration of one line scansion, after a selected number of synchronizing pulses has been counted thereby.

The arrangement of FIGURE 1 employing the electronic apparatus of FIGURE 5 operates as follows. In response to the deflection signals supplied to coil 60 by generators 66 and 68, the beam of scanner tube 10 traces a scanning pattern (see FIGURE 6) on screen 18 composed of substantially parallel, horizontally-displaced vertical line-segments. The beam, in tracing this pattern, causes successive small areas of the screen coincident therewith sequentially to emit polychromatic ultraviolet light having a continuous spectrum over a substantial band of wavelengths. Lens 100 focuses this sequentially emitted polychromatic light on face 110 of prism 102 along lines substantially parallel to the base of prism 102. Under these conditions, prism 102 disperses the light impinging face 110 over a surface including the one of these lines instantaneously impinged by the latter light, and lens 104 focusses this dispersed light on mask 106 along a corresponding line which is substantially perpendicular to slit 108. Because the lines of the scanning pattern are laterally displaced from one another, the corresponding lines of dispersed light formed on mask 106 are also laterally displaced. Because each line of dispersed light impinging mask 106 is transverse to slit 108, only the small portion thereof intersecting the slit is transmitted through ocular 74 to illuminate a corresponding point on the specimen. Moreover during the scansion of each line of the scanning pattern, the light passing through the portion of slit 108 intersected by the corresponding line of dispersed light focussed thereon is monochromatic and has a wavelength dependent on the vertical position of the small area of screen 18 then emitting light. Accordingly as the flying spot moves vertically and continuously along a line of the scanning pattern, the wavelength of monochromatic light transmitted through the intersected portion of slit 108 also varies continuously. Moreover the wavelength of monochromatic light passing through slit 108 in response to light emitted by any line of the scanning pattern from a point thereon positioned at any given vertical level is substantially the same for all lines thereof. Accordingly by scanning the beam of tube 94 horizontally in coordination with the vertical scansion of the beam of scanner tube 10, deflecting the beam of tube 94 in a vertical direction by an amount dependent on the instantaneous intensity of the light transmitted through the single point of slit 108 intercepted by the line of dispersed light focussed on mask 106 and turning on the beam of tube 94 only during the scansion on screen 18 along a single line, a graphical display of the form shown in FIGURE 7 is produced on screen 96 of tube 94. In this display the axis of abscissas 128 represents the wavelength of monochromatic light incident on the illuminated point of the specimen and the axis of ordinates 130 represents the intensity of light transmitted through the illuminated point of the specimen. The curve 132 displayed on the screen is the continuous absorption spectrum of the point of the specimen illuminated during the scanning of a selected single line of the scanning pattern.

For the foregoing it will be understood that the spectrum of any point along the image of slit 108 formed on the specimen by the optics of microscope 72 can be obtained almost instantaneously merely by adjusting line selector 126 to turn on the beam of tube 94 only during the scansion on screen 18 of the single line producing dispersed light intersecting that point. Moreover any point in the specimen may be spectroanalyzed merely by centering it beneath objective 76.

The above-described specific embodiments of the invention are only two of numerous alternative embodiments thereof. Thus while the embodiments specifically described are particularly well suited for obtaining the ultraviolet absorption spectrum of microscopic specimens, they readily can be altered to obtain visible and infrared spectra thereof, e.g. by replacing scanner tube 10 with one whose screen has a phosphor radiating light over the desired band of wavelengths and by employing optics and a photodetector respectively operative over and responsive to light in the desired band of wavelengths.

Prism 102 may be replaced by other light-dispersing means. For example a transmission grating having its lines horizontally oriented may be substituted for prism 102. The grating preferably is composed of a material efficiently transmissive of the radiation emitted by the scanner tube. Thus where the scanner tube emits ultraviolet light, a fused-quartz grating may be employed. Alternatively a concave reflection grating may be employed in place of prism 102. In this case lenses 100 and 104, prism 102 and mirror 84 would be removed, and screen 18 and mask 106 would be positioned with respect to the axis of the reflection grating so that light from screen 18 would be incident on the grating and the light dispersed thereby would be focused thereby onto mask 106 in an appropriate orientation.

Mask 106 has been shown for simplicity in the form of a tab which is slidable into a slot formed in tubing 132 supporting optical elements of the system, and has a slit 108 positioned on the tab so as to coincide with a diameter of the circular cross-section of tubing 132. However in order to permit variations in the bandwidth of the substantially monochromatic light passing through slit 108 or to permit the slit to be positioned off-center, a somewhat more elaborate though conventional apparatus may be provided in place of mask 106. For example such apparatus may comprise a pair of opposed spring-loaded, knife-edged jaws whose separation and centering are controllable by tracking screws.

While the foregoing system is especially well adapted for microspectroscopy, it can also be used for spectro-analyzing macroscopic specimens. In such a case, microscope 72 may be replaced by an appropriate translucent cell for containing the specimen, and appropriate optics for focussing on the specimen the monochromatic light transmitted through slit 108. Photomultiplier tube 85 would then be positioned so as to receive light from slit 108 transmitted through the specimen.

While I have described my invention by means of specific examples and in specific embodiments I do not wish to be limited thereto, for obvious modifications will occur to those skilled in the art without departing from the scope of my invention.

I claim:

1. A light source comprising means for causing successive small areas located along a plurality of successive substantially parallel paths lying on a surface sequentially to emit polychromatic light; means, impinged by light from the emissive one of said small areas, for angularly dispersing said impinging light into a succession of monochromatic components; and means impinged by said dispersed light along a line, the last-named means having a slit oriented transverse to said line for selectively transmitting those of said components of said dispersed light incident on said slit.

2. A light source according to claim 1, wherein said dispersion means disperses in a plane said light impinging said dispersion means from said emissive one of said small areas, and said parallel paths are oriented so that said polychromatic light sequentially emitted by said small areas impinges said dispersion means along successive lines transverse to said plane.

3. A light source according to claim 1, wherein said dispersion means disperses in a plane said light impinging said dispersion means from said emissive one of said small areas, and said plurality of successive substantially parallel paths are oriented so that said polychromatic light sequentially emitted by said small areas located along said successive paths impinges said dispersion means along successive substantially parallel lines, said light sequentially emitted by those of said small areas lying along any one of said paths impinging said dispersion means along only one of said lines, and said one line lying in only one of said planes of dispersion.

4. A light source comprising a cathode-ray tube having a screen emissive of polychromatic light on impingement by a cathode-ray beam; means for scanning a cathode-ray beam over said screen along a plurality of successive substantially parallel rectilinear paths to cause successive small areas of said screen lying on said paths sequentially to emit polychromatic light; means for angularly dispersing, in a plane and into a succession of monochromatic components, polychromatic light impinging said dispersion means from the emissive one of said small areas; and masking means impinged along a line by light emitted from said one area and dispersed by said dispersion means, said masking means having a straight slit oriented substantially perpendicular to said line for selectively transmitting those of said components of said dispersed light incident on said slit, said parallel scansion paths being oriented so that said polychromatic light sequentially emitted by successive small areas of said screen impinges said dispersion means along successive lines substantially perpendicular to said plane.

5. A light source according to claim 4, wherein said dispersion means comprises a triangular prism having a longitudinal axis and a face parallel to said axis, and said source comprises means for directing onto said face, along said successive lines, light sequentially emitted by said successive small areas, said prism being oriented so that said successive lines are substantially parallel to said longitudinal axis of said prism.

6. A light source comprising a cathode-ray tube having a screen emissive of polychromatic light on impingement by a cathode-ray beam; means for scanning a cathode-ray beam over said screen along a plurality of successive substantially parallel rectilinear paths to cause successive small areas of said screen lying on said paths sequentially to emit polychromatic light; means for angularly dispersing, in a plane and into a succession of monochromatic components, polychromatic light impinging said dispersion means from the emissive one of said small areas; and masking means impinged along a line by light emitted from said one area and dispersed by said dispersion means, said masking means having a straight slit oriented substantially perpendicular to said line for selectively transmitting those of said components of said dispersed light incident on said slit, said plurality of successive substantially parallel scansion paths being oriented so that said polychromatic light sequentially emitted by said small areas lying on said successive paths impinges said dispersion means along successive substantially parallel lines, said light sequentially emitted by those of said small areas lying along any one of said paths impinging said dispersion means along only one of said lines, and said one line lying in only one of said plates of dispersion.

7. A light source according to claim 6, wherein said dispersion means comprises a triangular prism having a pair of bases and a face perpendicular to said bases, and said source comprises means for directing onto said face, along said successive lines, light sequentially emitted by said successive small areas, said prism being oriented so that said successive lines are substantially parallel to said bases of said prism.

References Cited by the Examiner

UNITED STATES PATENTS

| | | | |
|---|---|---|---|
| 1,792,046 | 2/31 | Skaupy | 240—1 |
| 1,810,669 | 6/31 | Loeb | 240—1 |
| 2,437,323 | 3/48 | Heigl et al. | 88—14 |
| 2,444,560 | 7/48 | Feldt et al. | 88—14 |
| 2,645,971 | 7/53 | Herbst | 250—217 |
| 2,793,560 | 5/57 | Rennick | 88—14 |
| 913,584 | 11/59 | Dill | 250—217 |

JEWELL H. PEDERSEN, *Primary Examiner.*

EMIL G. ANDERSON, *Examiner.*